United States Patent
Saha et al.

(10) Patent No.: US 9,268,664 B2
(45) Date of Patent: Feb. 23, 2016

(54) METHOD AND SYSTEM FOR SYNCHRONOUS AND ASYNCHRONOUS MONITORING

(75) Inventors: Debashis Saha, San Jose, CA (US);
Mahesh K. Somani, Milpitas, CA (US);
Kumar Rethinakaleeswaran, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 1211 days.

(21) Appl. No.: 12/755,296

(22) Filed: Apr. 6, 2010

(65) Prior Publication Data

US 2011/0246640 A1    Oct. 6, 2011

(51) Int. Cl.
| | |
|---|---|
| G06F 15/173 | (2006.01) |
| G08B 21/00 | (2006.01) |
| H04N 5/932 | (2006.01) |
| G06F 11/34 | (2006.01) |
| H04L 12/26 | (2006.01) |
| H04L 29/08 | (2006.01) |
| H04L 7/00 | (2006.01) |

(52) U.S. Cl.
CPC ........ *G06F 11/3476* (2013.01); *G06F 11/3495* (2013.01); *H04L 43/0817* (2013.01); *H04L 67/1008* (2013.01); *H04L 67/1034* (2013.01); *G06F 2201/875* (2013.01); *H04L 7/00* (2013.01)

(58) Field of Classification Search
CPC  H04W 52/282; H04W 52/56; G06F 11/3476; G06F 11/3495; G06F 2201/875; G06F 2201/885; H04J 2203/006; H04J 3/14; H04L 12/26; H04L 43/00; H04L 43/0817; H04L 67/1008; H04L 67/1034; H04L 7/00; H04L 7/0008

USPC .............................................. 705/1; 709/224
See application file for complete search history.

(56) References Cited

U.S. PATENT DOCUMENTS

| | | | | |
|---|---|---|---|---|
| 6,068,661 | A * | 5/2000 | Shari | 703/27 |
| 6,219,711 | B1 * | 4/2001 | Chari | 709/232 |
| 6,591,396 | B1 * | 7/2003 | Honda | 714/798 |
| 7,103,008 | B2 * | 9/2006 | Greenblat et al. | 370/258 |
| 7,689,998 | B1 * | 3/2010 | Chrysanthakopoulos | 718/104 |
| 7,788,674 | B1 * | 8/2010 | Siegenfeld | 719/313 |
| 7,835,319 | B2 * | 11/2010 | Sugar | 370/328 |
| 7,958,159 | B1 * | 6/2011 | Tran et al. | 707/802 |
| 2003/0101291 | A1 * | 5/2003 | Mussack et al. | 709/328 |
| 2005/0114494 | A1 * | 5/2005 | Beck et al. | 709/224 |
| 2005/0177872 | A1 * | 8/2005 | Boulanger et al. | 726/22 |

(Continued)

FOREIGN PATENT DOCUMENTS

JP           04065746  A  *  3/1992  ............ G06F 13/42

*Primary Examiner* — Arvin Eskandarnia
*Assistant Examiner* — Margishi Desai
(74) *Attorney, Agent, or Firm* — Schwegman Lundberg & Woessner, P.A.

(57) ABSTRACT

A system and method for synchronous and asynchronous monitoring of network resources is provided. In an example system, an asynchronous monitoring engine is in communication with the network resources and receives asynchronous data from a portion of the network resources. The asynchronous data is collected at an application layer or at an end-user application layer. A synchronous monitoring engine is also in communication with the network resources and accesses synchronous data in the application layer in response to receiving a request from the asynchronous monitoring engine. The system further identifies an anomaly corresponding to the asynchronous characteristic and the synchronous characteristic.

15 Claims, 9 Drawing Sheets

(56) References Cited

U.S. PATENT DOCUMENTS

| | | | |
|---|---|---|---|
| 2005/0235253 A1* | 10/2005 | Petersen | G06F 8/34 717/105 |
| 2005/0262237 A1* | 11/2005 | Fulton et al. | 709/224 |
| 2006/0206559 A1* | 9/2006 | Xie et al. | 709/201 |
| 2006/0259603 A1* | 11/2006 | Shrader et al. | 709/223 |
| 2007/0160022 A1* | 7/2007 | McCoy et al. | 370/338 |
| 2007/0263550 A1* | 11/2007 | Perng et al. | 370/252 |
| 2008/0127325 A1* | 5/2008 | Ebrom et al. | 726/14 |
| 2008/0244035 A1* | 10/2008 | Horie | 709/217 |
| 2008/0270523 A1* | 10/2008 | Parmar et al. | 709/203 |
| 2009/0037193 A1* | 2/2009 | Vempati et al. | 705/1 |
| 2009/0038010 A1* | 2/2009 | Ma et al. | 726/23 |
| 2009/0129359 A1* | 5/2009 | Lee et al. | 370/342 |
| 2009/0320021 A1* | 12/2009 | Pan et al. | 718/100 |
| 2010/0050248 A1* | 2/2010 | Porras et al. | 726/13 |
| 2010/0087214 A1* | 4/2010 | Bournel et al. | 455/466 |
| 2010/0094948 A1* | 4/2010 | Ganesh et al. | 709/212 |
| 2010/0257229 A1* | 10/2010 | Bolohan et al. | 709/203 |
| 2010/0262447 A1* | 10/2010 | Charles | 705/7 |
| 2011/0047413 A1* | 2/2011 | McGill et al. | 714/15 |

* cited by examiner

METHOD AND SYSTEM FOR SYNCHRONOUS AND ASYNCHRONOUS MONITORING

TECHNICAL FIELD

This disclosure relates to communications over a distributed network system.

BACKGROUND

Some of the issues of distributed network system performance include monitoring of target systems to detect a network deficiency, recurring exception, or other anomaly.

BRIEF DESCRIPTION OF DRAWINGS

Embodiments of the present technology are illustrated by way of example in the figures of the accompanying drawings, in which similar reference numbers indicate similar elements and in which.

DETAILED DESCRIPTION

The embodiments described herein may be implemented in an operating environment comprising software installed on a computer, hardware, or a combination of software and hardware.

In a distributed computing environment, a large number of hardware, software, and networking elements operate to provide a web service such as an e-commerce site, web publishing site, or the like. An anomaly may originate anywhere within the distributed computing environment as a result of a security vulnerability, a bad section of code, a surge in user activity, and the like. As used herein, an "anomaly" occurs in the application layer (e.g., layer 7 of the OSI model) or in a "higher level" such as in an end-user application hosted by an application server. The anomaly may result in slower response times and/or make the web service (or portions thereof) inaccessible to users over a period of time. An anomaly is identified based on a set of characteristics identified over time and/or across elements in the distributed computing environment. Each anomaly is associated with a unique set of characteristics. The unique set of characteristics may be referred to as a "fingerprint" of the anomaly.

To identify an anomaly, characteristics at the application level of a target system are monitored asynchronously. The asynchronous monitoring may include calculating metrics over a period of time or across elements in the distributed computing environment. If one or more characteristics of an anomaly occur, a determination is made to trigger synchronous monitoring of the system. Based on data collected during the synchronous monitoring, additional characteristics may be determined from which the anomaly can be identified. The anomaly, once identified, can be corrected and/or monitored over an extended period of time. Described herein is a method and system for identifying one or more characteristics of an anomaly based on asynchronous data, determining whether to initiate synchronous data collection, and to identify an anomaly based on a number of characteristics.

Figure 1:
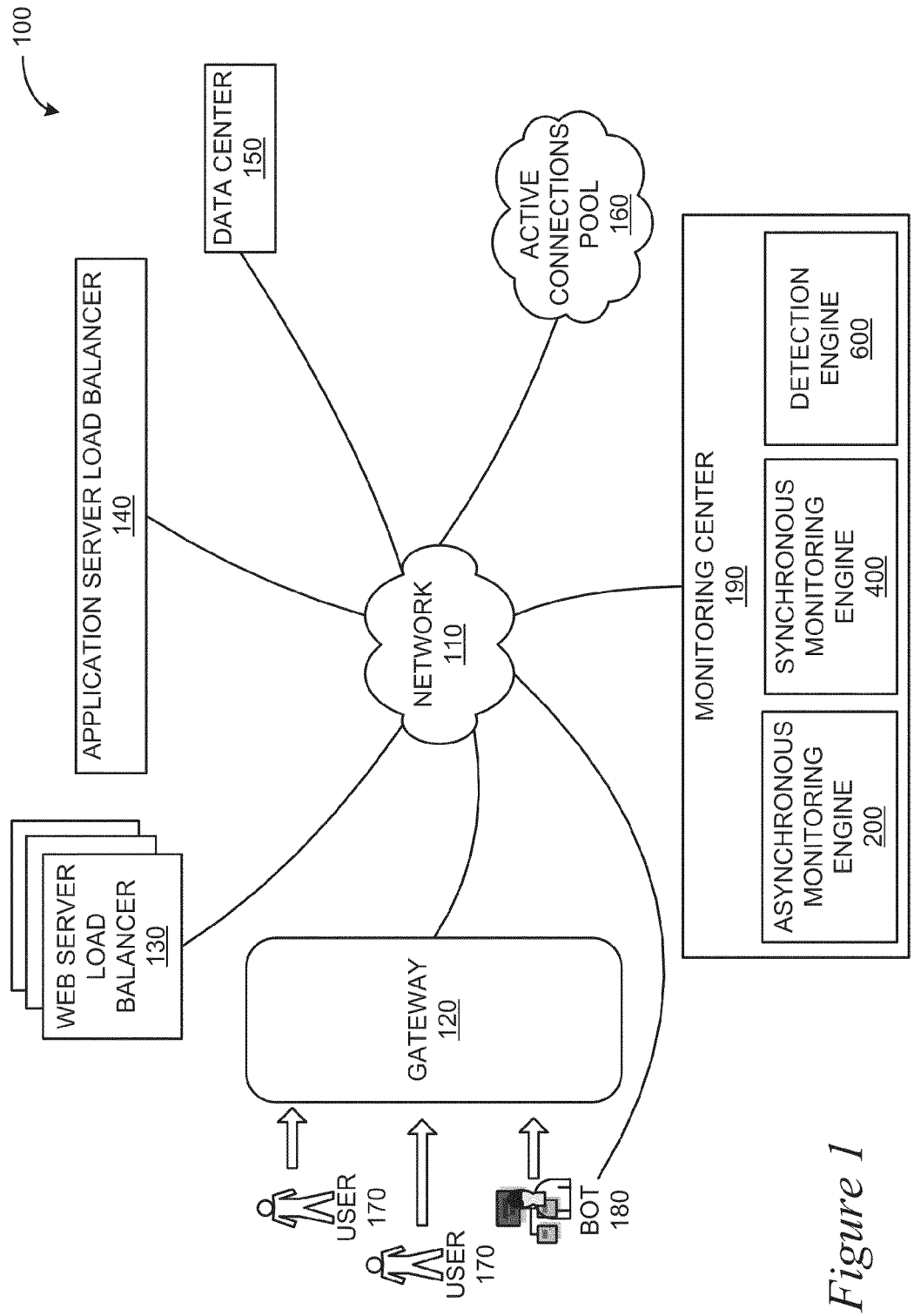
FIG. 1 is a diagrammatic representation of a network environment within which example embodiments may be implemented.

FIG. 1 shows a sample network environment 100, within which methods and systems are described to detect an anomaly based on one or more characteristics identified using asynchronous and synchronous data collection at an application layer and/or at an end-user application layer. The methods and systems may be implemented in accordance with the example embodiment. As shown in FIG. 1, the sample network environment 100 may comprise a network 110, a gateway 120, a web server load balancer 130, an application server load balancer 140, a data center 150, an active connections pool 160, and a monitoring center 190. In some embodiments, the active connections pool 160 is optional or may be represented by metrics collected at the web server load balancer 130 and the application server load balancer 140. The monitoring center 190 may include an asynchronous monitoring engine 200, a synchronous monitoring engine 400, and a detection engine 600. The network 110 may be a network of data processing nodes that are interconnected for the purpose of data communication.

The illustrated web server load balancer 130 and the application server load balancer 140 (e.g. F5, NetScaler, or Cisco) are not limited to any specific type. The web server load balancer 130 and the application server load balancer 140 may be utilized to spread work among many servers in order to horizontally scale the application and provide redundancy for failover. The web server load balancer 130 and the application server load balancer 140 may be utilized to increase capacity of a plurality of servers. The web server load balancer 130 and the application server load balancer 140 may include a virtual IP (VIP) server which, in turn, includes an IP (Internet Protocol) address and port. The virtual server may be bound to a number of physical services running on physical servers in a server farm. Usually a TCP or UDP port number is associated with the VIP, such as TCP port 80 for web traffic. A load balancer then dispenses traffic to multiple application servers, and the VIP server may spread traffic among the application servers (including physical or virtualized servers) using different schemes. A physical server may contain the physical server's IP address and port. As an example, a service request may be sent to the virtual server using the virtual server IP address which, in turn, selects a physical server in a server farm and directs this request to the selected physical server.

When a service request is placed at the application tier, the service request may go through initial firewalls and routers before getting into the sample network environment 100. The service request may pass through the web server load balancer 130 and the application server load balancer 140, where the request may be directed according to a category of the request. The sample network environment 100 may be distributed throughout multiple geographically remote facilities. It will be appreciated that the gateway 120, the web server load balancer 130, and the application server load balancer 140 may not be included in the sample embodiments of the systems described herein because the sample network environment 100 is merely a sample implementation and the systems described herein are not technology-specific.

In an example embodiment, the gateway 120 may be a network point that acts as an entrance to the sample network environment 100 for one or more users 170 and bots 180. In the sample network environment 100, a computer server acting as a gateway 120 may also be acting as a proxy server and a firewall server. The gateway 120 may be associated with both a router, which knows where to direct a given packet of data that arrives at the gateway 120, and a switch, which may furnish the actual path in and out of the gateway for a given packet.

In an example embodiment, the web server load balancer 130 may be used to increase the capacity of a server farm beyond that of a single server. It may also allow the service to continue even in the face of server down time due to server failure or server maintenance. As mentioned above, the application server load balancer 140 may include a virtual server which, in turn, may include an IP address and port. This virtual server may be bound to a number of physical services running on the physical servers in a server farm. These physical services may contain the physical server's IP address and port. When a request is sent to the virtual server, the virtual server in turn selects a physical server in the server farm and directs this request to the selected physical server. Accordingly, a role played by the application server load balancer 140 is managing connections between clients and servers. Different virtual servers may be configured for different sets of physical services, such as Transmission Control Protocol (TCP) and User Datagram Protocol (UDP) services in general. Protocol or application-specific virtual servers that may be supported include Hyper Text Transfer Protocol (HTTP), File Transfer Protocol (FTP), SSL, SSL BRIDGE, SSL TCP, NNTP, Session Initiation Protocol (SIP), and Domain Name System (DNS). The load balancing methods may manage the selection of an appropriate physical server in a server farm. The application server load balancer 140 may also perform server monitoring of services in a web server farm. In case of failure of a service, the application server load balancer 140 may continue to perform load balancing across the remaining services. In case of failure of the servers bound to a virtual server, requests may be sent to a backup virtual server, if configured, or optionally redirected to a configured Uniform Resource Locator (URL).

In some example embodiments, the data center 150 may be a facility utilized for housing electronic equipment, typically computers and communications equipment. The computers and the communication equipment may be used for the purpose of handling the data of the data center 150. One of the purposes of the data center 150 may be to run the applications that may handle business and operational data. The data center 150 may be proprietary and developed internally, or bought from enterprise software vendors. Components of the data center 150 may include databases, file servers, application servers, and middleware. The data center 150 may also be used for offsite backups. A list of enabled filters as determined by the request filtering processor (not shown) may be maintained in a database of the data center 150 and applied against specific URLs and available URLs.

In some example embodiments, the active connections pool 160 may be a number of threads that are created to perform a number of tasks, usually organized in a queue. As soon as a thread completes its task, it may request the next task from the queue, and so forth. The thread may then terminate, or sleep, until there are new tasks available. The number of threads used is a parameter that can be altered to provide the best performance. The cost of having a larger thread pool may be an increased resource usage. Too many threads in the active connections pool 160 may waste resources utilized in creating the unused threads, destroying too many created threads, and spending more time later creating the threads again. On the contrary, creating threads too slowly may result in poor performance and may starve other processes of resources. With reference to the active connections pool 160, there may be a finite number of threads available per the active connections pool 160. A thread pool may be used instead of creating a new thread for each task to improve performance and system stability.

In some example embodiments, the monitoring center 190 may comprise asynchronous monitoring engine 200, the synchronous monitoring engine 400, and the detection engine 600. The asynchronous monitoring engine 200 and the synchronous monitoring engine 400 may receive or collect data from the other components of the sample network environment 100 to identify one or more characteristics or anomalies. The detection engine 600 is to compare the identified characteristics to stored fingerprints of known anomalies to identify a current anomaly. It will be appreciated that the roles of the engines described herein are closely related and may be supplemental or redundant.

Figure 2:
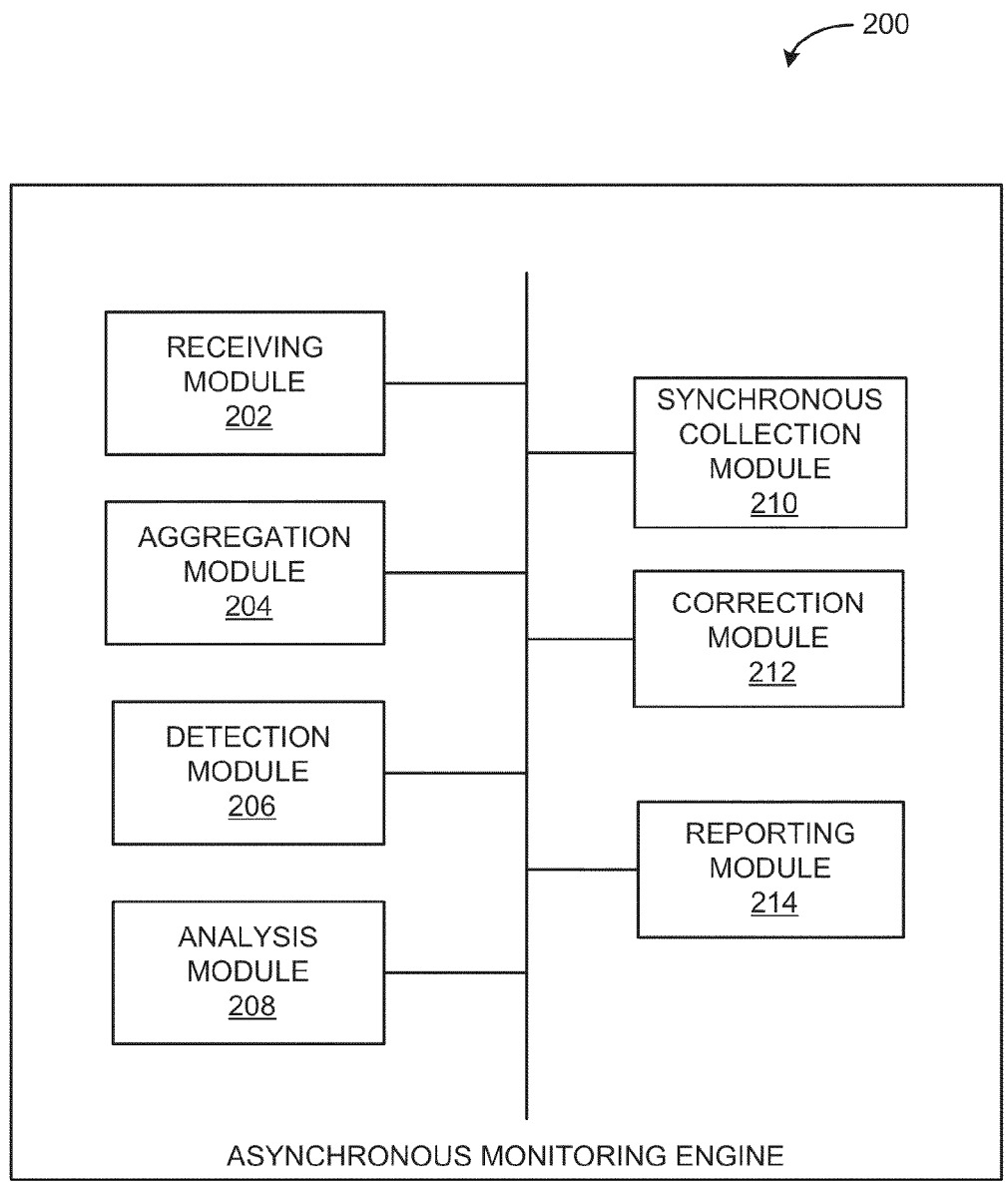
FIG. 2 is a block diagram of an asynchronous monitoring engine, in accordance with an example embodiment.

Referring to FIG. 2 of the drawings, the asynchronous monitoring engine 200 is shown to include several components that may be configured to perform various operations. The asynchronous monitoring engine 200 may comprise a receiving module 202, an aggregation module 204, a detection module 206, an analysis module 208, a synchronous collection module 210, a correction module 212, and a reporting module 214.

The receiving module 202, in an example embodiment, may be configured to receive information asynchronously gathered in the network resources of the sample network environment 100 of FIG. 1 in, for example, logs having utilization metrics about component performance and service levels. The receiving module 202 may receive information on a periodic basis from the network resources. Utilization metrics include, for example, central processing unit (CPU) usage, memory utilization, executed transactions, errors, exceptions, thread utilization, and events.

The aggregation module 204, in an example embodiment, is configured to aggregate the utilization metrics received from a network resource by the receiving module 202 with the utilization metrics received from the network resources homogeneous to the network resource (i.e., across servers). The aggregation module 204 may compare the utilization metrics to previous utilization metrics received from the network resources (i.e., over time) by, for example, calculating a running average or determining a maximum value and a minimum value. The aggregation may be performed to allow an analysis to be performed with respect to the aggregated utilization metrics to determine if one or more characteristics of an anomaly are presently occurring within or across the network resources.

The detection module 206, in an example embodiment, may be configured to determine whether or not there is a characteristic of an anomaly in the sample network environment 100 based on the analysis of the aggregated utilization metrics received by the receiving module 202 and aggregated by the aggregation module 204. If the detection module 206 determines that the aggregated utilization metrics of the network resources exceed a predetermined threshold or has changed significantly, the analysis module 208 may be alerted. The analysis module 208, in an example embodiment, may be configured to determine if a combination of one or more characteristics are indicative of an anomaly to be corrected or monitored. In some instances, the analysis module 208 may access or communicate with the detection engine 600 of FIG. 1.

The synchronous collection module 210 is to trigger synchronous data collection at one or more network resources in response to a communication from the analysis module 208. The synchronous data collection may be triggered if the analysis module 208 has received one or more characteristics but is unable to determine an anomaly corresponding to those characteristics. The synchronous data collection module 210 triggers the synchronous data collection by sending a request to the synchronous monitoring engine 400 of FIG. 1. The request may identify one or more network resources to be synchronously monitored.

An optional correction module 212, in some example embodiments, may be configured to initiate a correction of an identified anomaly. To correct the anomaly, the correction module 212 may redirect traffic in the sample network environment 100, shut down or suspend a portion of the network resources, implement one or more filters, or the like.

The reporting module 214, in an example embodiment, may be configured to report a determination made by the detection module 206, analysis module 208, synchronous collection module 210, and/or the correction module 212 as to whether characteristics of an anomaly were detected, an anomaly was identified whether synchronous monitoring was triggered, and/or if a correction was initiated. A report may be made to the monitoring center 190 of FIG. 1, the synchronous monitoring engine 400, and/or the detection engine 600.

Figure 3:
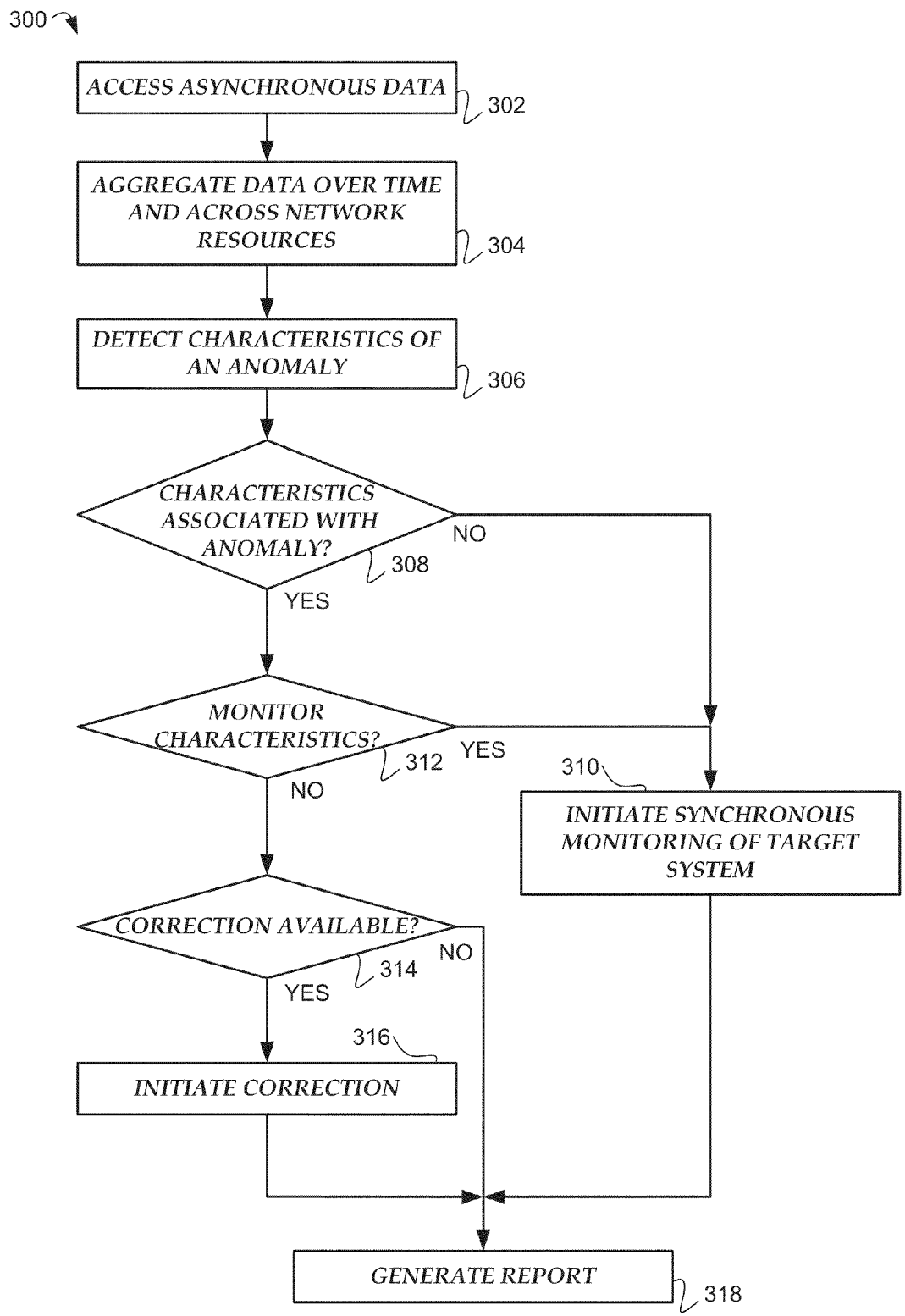
FIG. 3 is a flow chart illustrating a method to detect an anomaly using asynchronous monitoring, in accordance with an example embodiment.

FIG. 3 is a flow chart illustrating a method 300 to detect an anomaly using asynchronous detection, according to one example embodiment. The method 300 may be performed by processing logic that may comprise hardware (e.g. dedicated logic, programmable logic, microcode, etc.), software (such as run on a general purpose computer system or a dedicated machine), or a combination of both. In one example embodiment, the processing logic resides at the asynchronous monitoring engine 200 illustrated in FIG. 2. The method 300 may be performed by the various modules discussed above with reference to FIG. 2. These modules may comprise processing logic.

As shown in FIG. 3, the method 300 commences with accessing asynchronous data at operation 302. The asynchronous data may include log files, reports generated on an occurrence of an event, or other asynchronously reported data. The logs may be collected at load balancers such as web server load balancer 130 of FIG. 1 and application server load balancer 140 of FIG. 1, application servers, and data centers such as data center 150 of FIG. 1. The asynchronous data collection may require fewer resources (e.g., memory and processing power) than synchronous data collection.

In an operation 304, an aggregation of the asynchronous data collected from many different network resources is calculated. The aggregation may be used calculated across network resources and/or over a period of time. In some instances, the amount of change or variation between or among network resources or over time is calculated. The asynchronous data may include data about CPU utilization, thread utilization, and memory exhaustion. The thread utilization logged by the network resource may include computing the percentage of the threads utilized.

At operation 306, the detection module 206 of FIG. 2 may identify one or more characteristics based on the asynchronous data and/or the aggregation of the asynchronous data. The detection may be based on, for example, a static or dynamic threshold, a running average, a minimum or maximum deviation, or using another technique.

At operation 308, the analysis module 208 of FIG. 2 determines that at least a portion of the characteristics are associated with (or are likely to be associated with) one or more anomalies. More specifically, the analysis module 208 may identify one or more particular anomalies associated with the characteristics. If no particular anomaly is identified or if it cannot be determined that the characteristics are associated with an anomaly, the analysis module 208 may communicate with the synchronous monitoring module 210 of FIG. 2 to initiate synchronous monitoring of one or more target systems in an operation 310.

If a particular anomaly is identified, a second determination is made by the analysis module 208 in an operation 312. The second determination is a determination as to whether to asynchronously and/or synchronously monitor the characteristics of the anomaly. The characteristics may be monitored to, for example, determine a "worst case" scenario if the anomaly is not corrected within a particular period of time. If the determination is made to monitor the characteristics, the synchronous monitoring of the target system may be optionally initiated (operation 310) in addition to the asynchronous monitoring. In some instances where more than one anomaly is occurring in the target system, the determination to monitor the characteristics of a particular anomaly may be based on a triage of the more than one anomaly.

If a determination to not monitor the characteristics is made, a determination that a correction is available for the anomaly is made by the correction module 212 of FIG. 2 in an operation 314. A correction may be available if the particular anomaly has previously occurred and been corrected in the target system (or in a similar system). If a correction is available, the correction is initiated in an operation 316. The correction may include restarting or suspending the target system, terminating a loop, or the like.

In an operation 318, a report is generated by the reporting module 214 of FIG. 2. The report may include the asynchronous characteristics, the synchronous characteristics, the particular anomaly, and/or the correction initiated.

Figure 4:
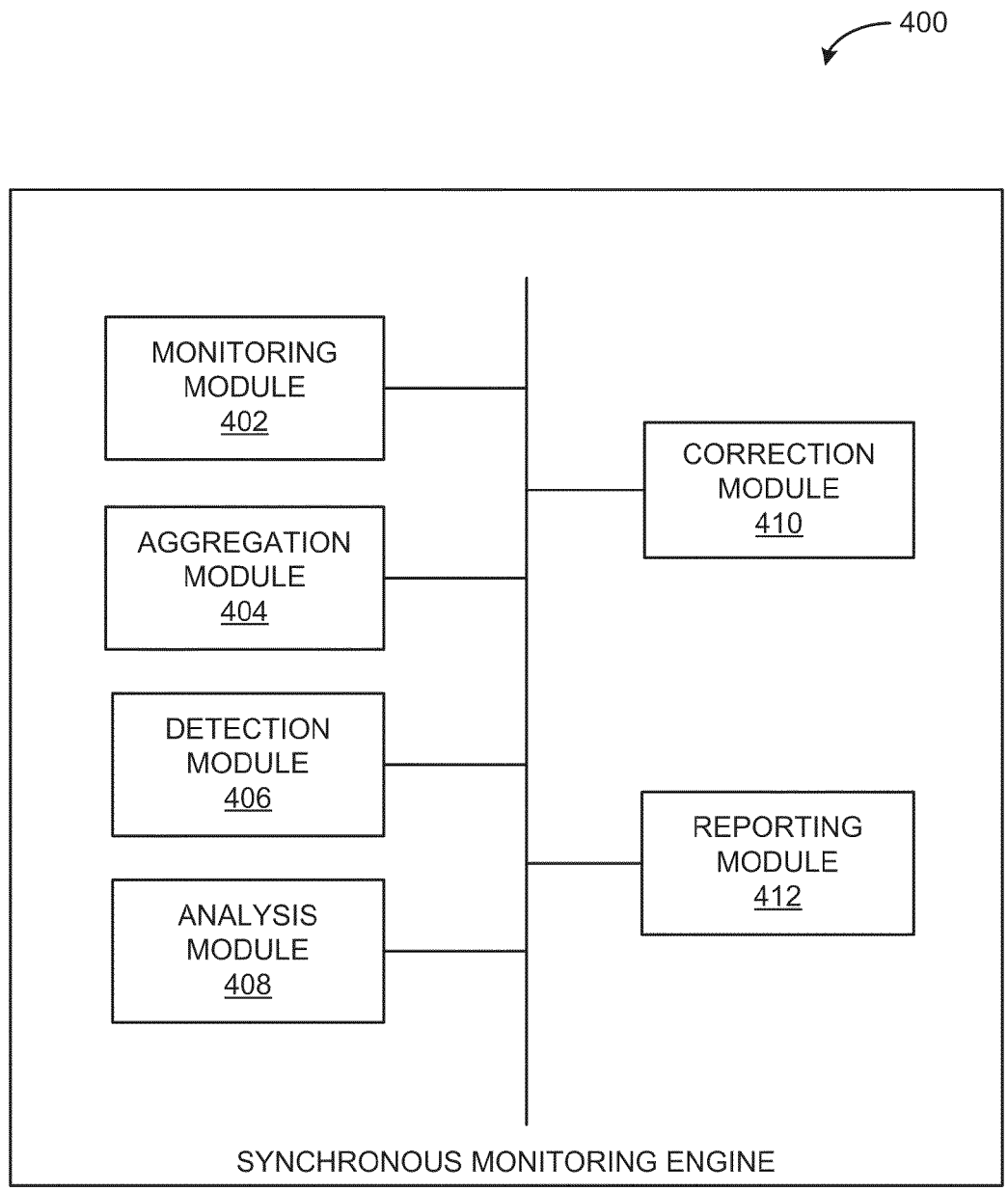
FIG. 4 is a block diagram of a synchronous monitoring engine, in accordance with an example embodiment.

Referring to FIG. 4 of the drawings, a block diagram of a synchronous monitoring engine 400 is depicted. The synchronous monitoring engine 400 is to access or receive synchronous data about a target system. The synchronous monitoring engine 400 comprises a monitoring module 402, an aggregation module 404, a detection module 406, an analysis module 408, a correction module 410, and a reporting module 412.

The monitoring module 402 is to access, receive, or otherwise collect synchronous data about a target system. The synchronous data includes CPU utilization, memory utilization, number of open threads, exceptions granted, a number of transactions executed, transaction times, and the like. The synchronous data is collected at the application layer and/or at an end-user application. The monitoring module 402 is to collect the synchronous data in response to a request to initiate the synchronous data collection from the asynchronous collection engine 200 of FIG. 1.

The aggregation module 404, in an example embodiment, is configured to aggregate the synchronous data received from a target system. The aggregation module 404 may compare the synchronous data to previously collected synchronous data target system (i.e., over time) by, for example, calculating a running average or determining a maximum value and a minimum value. The aggregation may be performed to allow an analysis to be performed with respect to the aggregated utilization metrics to determine if one or more characteristics of an anomaly are presently occurring within or across more than one target system.

The detection module 406, in an example embodiment, may be configured to determine whether or not there is a characteristic of an anomaly in the monitoring module 402 and aggregated by the aggregation module 404. If the detection module 406 determines that the aggregated synchronous data of the target system exceed a predetermined threshold or has changed significantly, the analysis module 408 may be alerted.

The analysis module 408, in an example embodiment, may be configured to determine if a combination of one or more characteristics are indicative of an anomaly to be corrected or monitored. The characteristics may be identified based on the asynchronous data and/or the synchronous data. In some instances, the analysis module 408 may access or communicate with the detection engine 600 of FIG. 1.

An optional correction module 410, in some example embodiments, may be configured to initiate a correction of an identified anomaly. To correct the anomaly, the correction module 410 may redirect traffic in the sample network environment 100 of FIG. 1, shut down or suspend a portion of the network resources, implement one or more filters, or the like.

The reporting module 412, in an example embodiment, may be configured to report a determination made by the detection module 406, analysis module 408, and/or the correction module 410 as to whether characteristics of an anomaly were detected, an anomaly was identified whether synchronous monitoring was triggered, and/or if a correction was initiated. A report may be made to the monitoring center 190 of FIG. 1, the asynchronous monitoring engine 200, and/or the detection engine 600.

Figure 5:
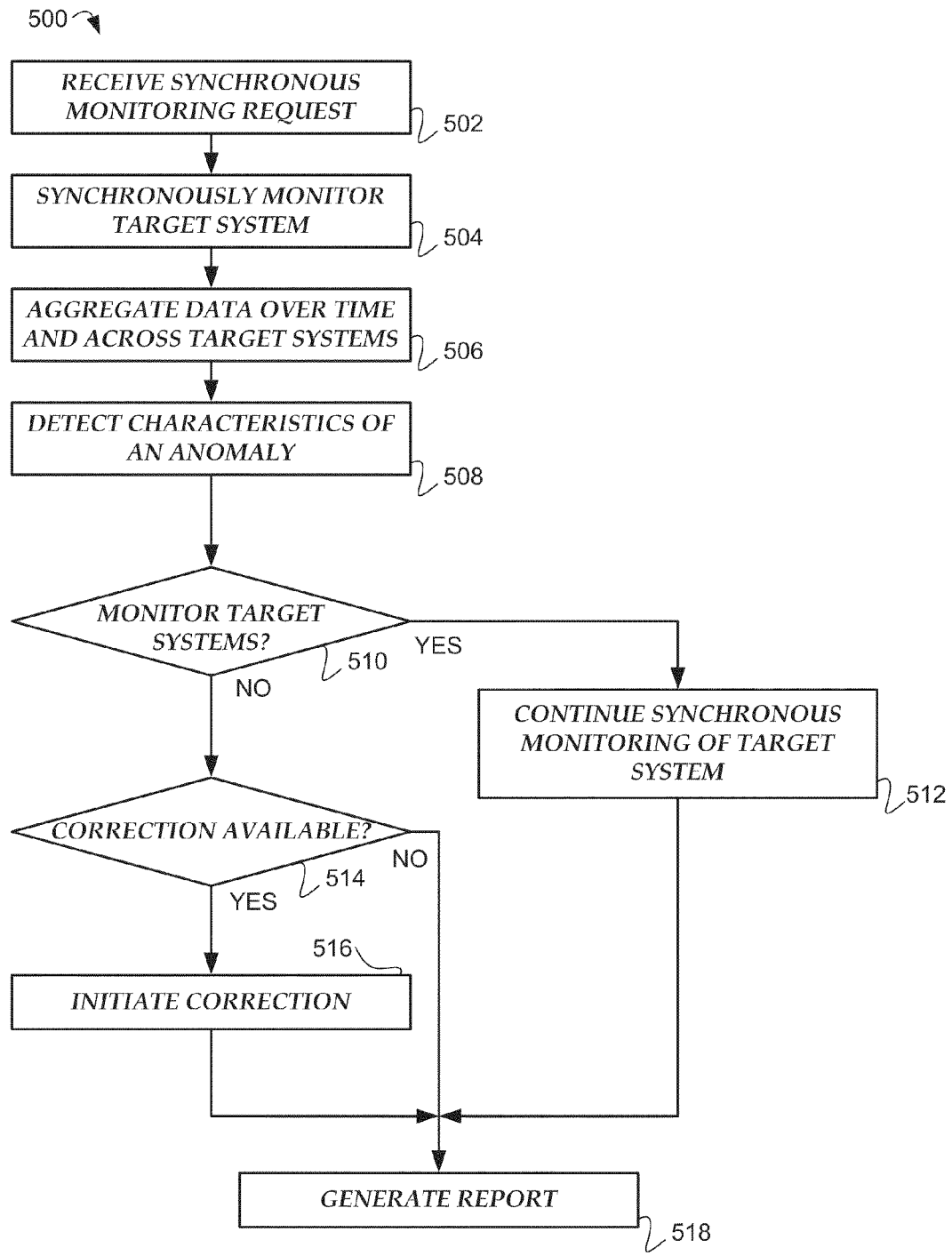
FIG. 5 is a flow chart illustrating a method to detect an anomaly using synchronous monitoring, in accordance with an example embodiment.

FIG. 5 is a flowchart of a technique 500 for synchronously monitoring one or more target systems in response to a request made based on asynchronous data. The technique 500 may be performed by the asynchronous monitoring engine 400 of FIG. 1.

In an operation 502, a synchronous monitoring request is received from an asynchronous monitoring engine 200 of FIG. 1. As described with respect to the asynchronous monitoring engine 200, the asynchronous data may indicate one or more characteristics of an anomaly. To identify additional characteristics, a portion of the network resources monitored by the asynchronous monitoring engine 200 may be selected as a target system to be synchronously monitored. The synchronous monitoring request may indicate which network resources are the target systems.

In an operation 504, the target system is synchronously monitored by the synchronous monitoring engine 400. The synchronous monitoring engine 400 may access or receive the synchronous data from the target systems.

In an operation 506, the synchronous data is aggregated. In some instances, the synchronous data may be aggregated across one or more target systems and/or over a period of time. The synchronous data may be aggregated with asynchronous data.

In an operation 508, one or more characteristics of an anomaly are detected. The characteristics detected by the synchronous monitoring engine are based on the synchronous data or on both the synchronous data and the asynchronous data. The operation 508 may further include identifying the anomaly.

In an operation 510, a determination is made whether to continue to synchronously monitor the target systems where identified characteristics occur. If the determination is made to continue monitoring, the target systems are monitored in an operation 512. The operation 512 may terminate upon an elapsed period of time, on a threshold (e.g., number of threads, CPU utilization, memory utilization, etc.) being met, or the like.

In an operation 514, if the determination is made to not monitor the target systems, a second determination is made as to whether a correction is available for the identified anomaly. If a correction is available, the correction is initiated in an operation 516. The correction may include restarting or suspending the target system, terminating a loop, or the like.

In an operation 518, a report is generated by the reporting module 412. The report may include the asynchronous characteristics, the synchronous characteristics, the particular anomaly, and/or the correction initiated.

Figure 6:
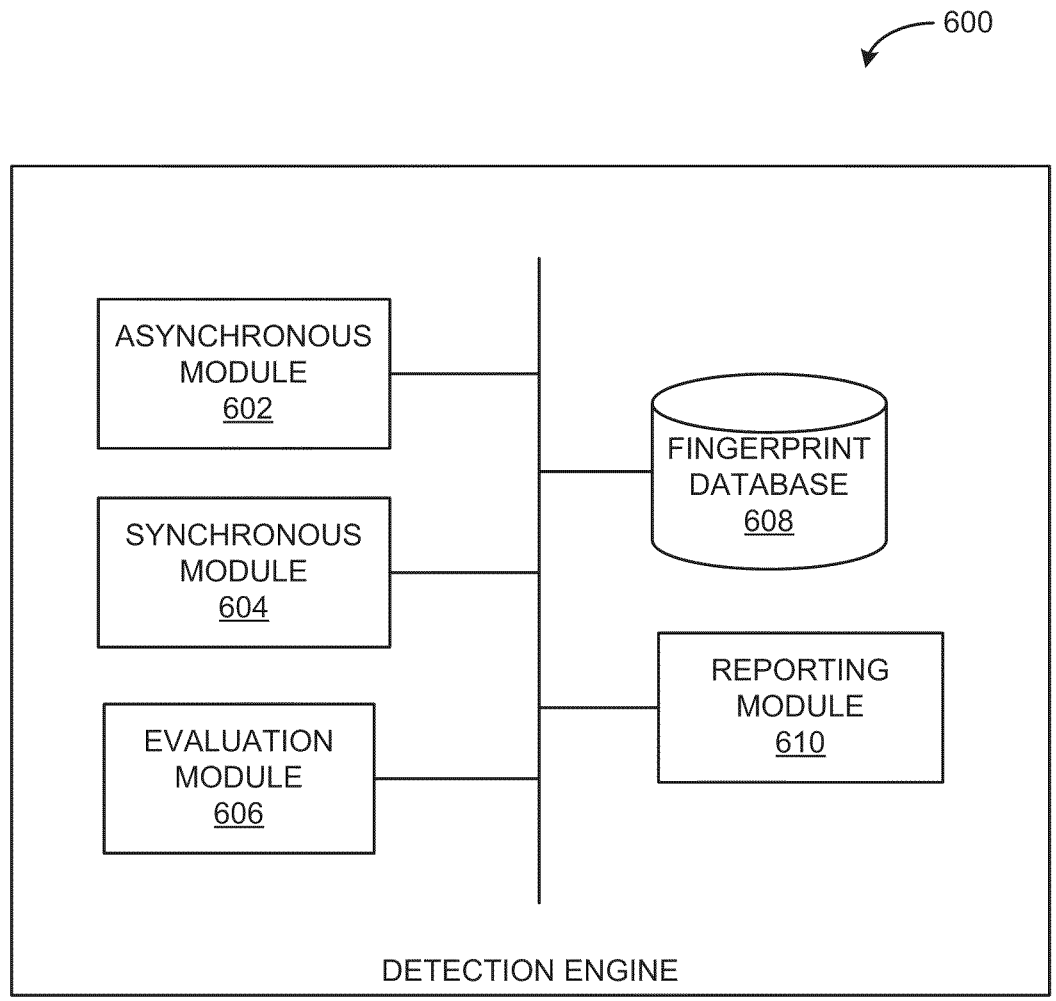
FIG. 6 is a block diagram of a detection engine, in accordance with an example embodiment.

Referring to FIG. 6 of the drawings, the detection engine 600 for detecting one or more anomalies based on asynchronous and synchronous data is shown to include several components that may be configured to perform various operations. The detection engine 600 may perform some of the same tasks as the asynchronous monitoring engine 200 of FIG. 2 and the synchronous monitoring engine 400 of FIG. 4. In some instances, the detection engine 600 may communicate its determinations to the asynchronous monitoring engine 200 and/or the synchronous monitoring engine 400. The detection engine 600 is shown as including an asynchronous module 602, a synchronous module 604, an evaluation module 606, a fingerprint database 608, and a reporting module 610.

The asynchronous module 602 is to access the asynchronous data from one or more network resources and the asynchronous monitoring engine 200. The accessed asynchronous data may include the asynchronous data, the aggregated asynchronous data, and characteristics or anomalies identified by the asynchronous monitoring engine 200.

Likewise, the synchronous module 604 is to access the synchronous data from one or more target systems and the synchronous monitoring engine 400. The accessed synchronous data may include the synchronous data, the aggregated synchronous (or the aggregated synchronous and asynchronous) data, and characteristics or anomalies identified by the asynchronous monitoring engine 200.

The evaluation module 606 is to evaluate that accessed synchronous data and the accessed synchronous data to identify one or more additional characteristics and/or to identify an anomaly associated with the characteristics. The evaluation module 606 may further determine whether to initiate synchronous monitoring or to continue monitoring the asynchronous and asynchronous data.

To identify an anomaly, the evaluation module 606 may access a fingerprint database 608. The fingerprint database 608 stores one or more "fingerprints" of previously identified anomalies. The fingerprints comprise a description of the characteristics associated with each anomaly. The characteristics may be based on the asynchronous data, the synchronous data, and/or aggregated data. Examples of characteristics that are identified include, for example, memory growth (e.g., leaks and server stability metrics), logical resource caps (e.g., a number of threads or connection pools), deadlocks or live-locks, infinite and long loops, non-balanced loads, high rate of application errors due to variety of reasons, hardware failures (e.g., processor failures or RAM failures), and other configuration limits. The fingerprint database 608 is further described in connection with FIG. 8.

The reporting module 610 reports a determination made by the evaluation module 606 as to whether characteristics of an anomaly were detected, an anomaly was identified, and/or whether synchronous monitoring was triggered. A report may be made to the monitoring center 190 of FIG. 1, the asynchronous monitoring engine 200, and/or the synchronous monitoring engine 400.

Figure 7:
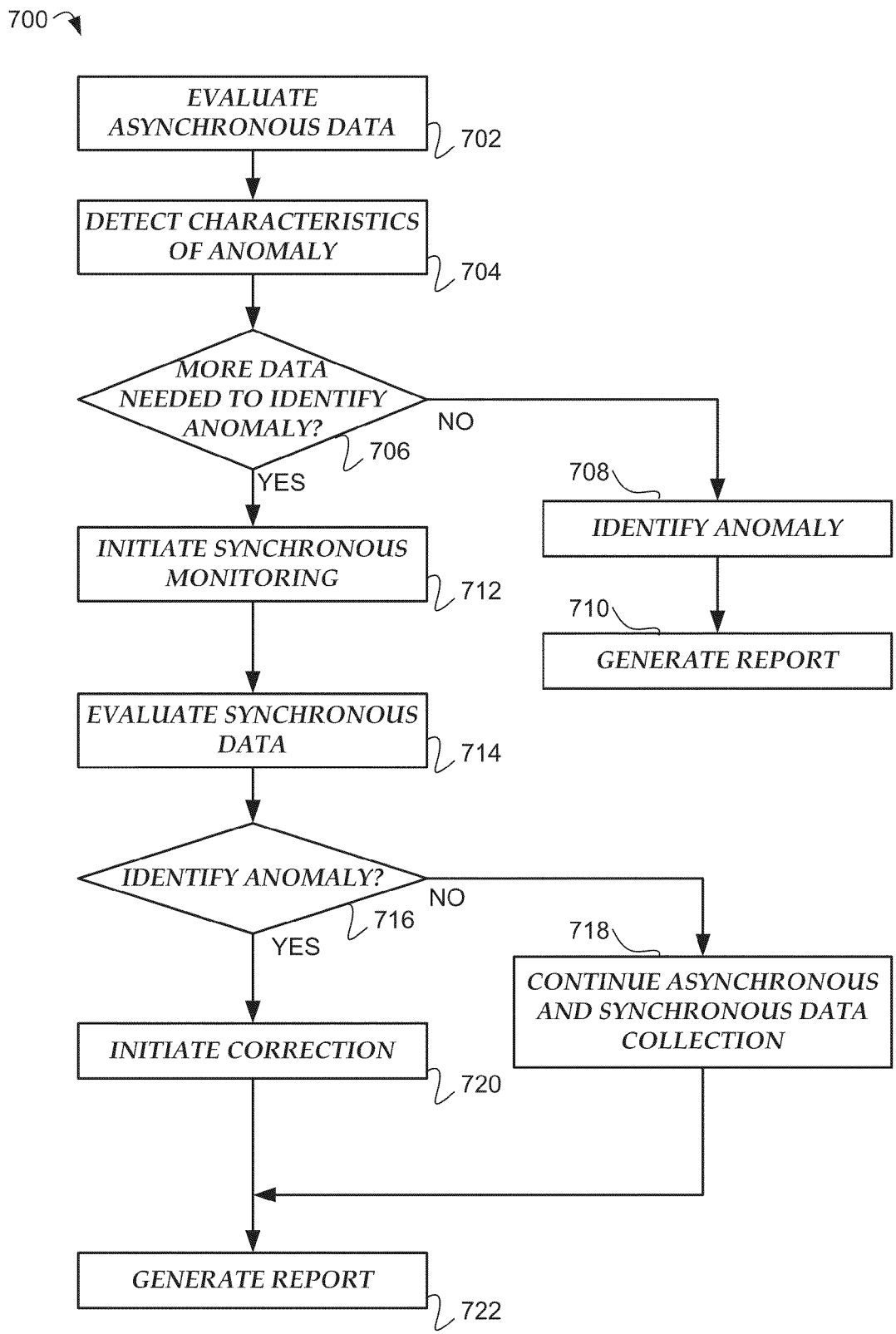
FIG. 7 is a flow chart illustrating a method to detect an anomaly using asynchronous and synchronous detection, in accordance with an example embodiment.

FIG. 7 is a flowchart of a method 700 for identifying one or more anomalies based on asynchronous and synchronous data according to an example embodiment. The method 700 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the detection engine 600 illustrated in FIG. 6. The method 700 may be performed by the various modules discussed above with reference to FIG. 6. These modules may comprise processing logic.

In an operation 702, the asynchronous data is evaluated and, in an operation 704, one or more characteristics of an anomaly are detected. At a step 706, a determination is made that more data is needed to identify an anomaly. The determination may be based on data stored in the fingerprint database 608 of FIG. 6. The determination performed in step 706 may be that not enough information is available in the asynchronous data to identify the anomaly. For example, the asynchronous data may be indicative of more than one known anomaly or may be incongruent with other known anomalies.

In an operation 708, if no additional data is required to identify the anomaly, the anomaly is identified. The identification may be sent to, for example, the asynchronous monitoring engine 200 of FIG. 2 to initiate a correction. Upon identifying the anomaly, a report is generated in an operation 710.

If more data, however, is needed to identify the anomaly, synchronous monitoring may be initiated in one or more target systems in an operation 712. The synchronous data is evaluated in an operation 714. At an operation 716, a determination is made as to whether the anomaly is identified based on the synchronous data and the asynchronous data. If the anomaly is not identified, the asynchronous and synchronous data collection is continued in an operation 718. If the anomaly is identified, a correction may be initiated in a step 720. Regardless of whether the anomaly is identified, a report is generated in a step 722.

Figure 8:
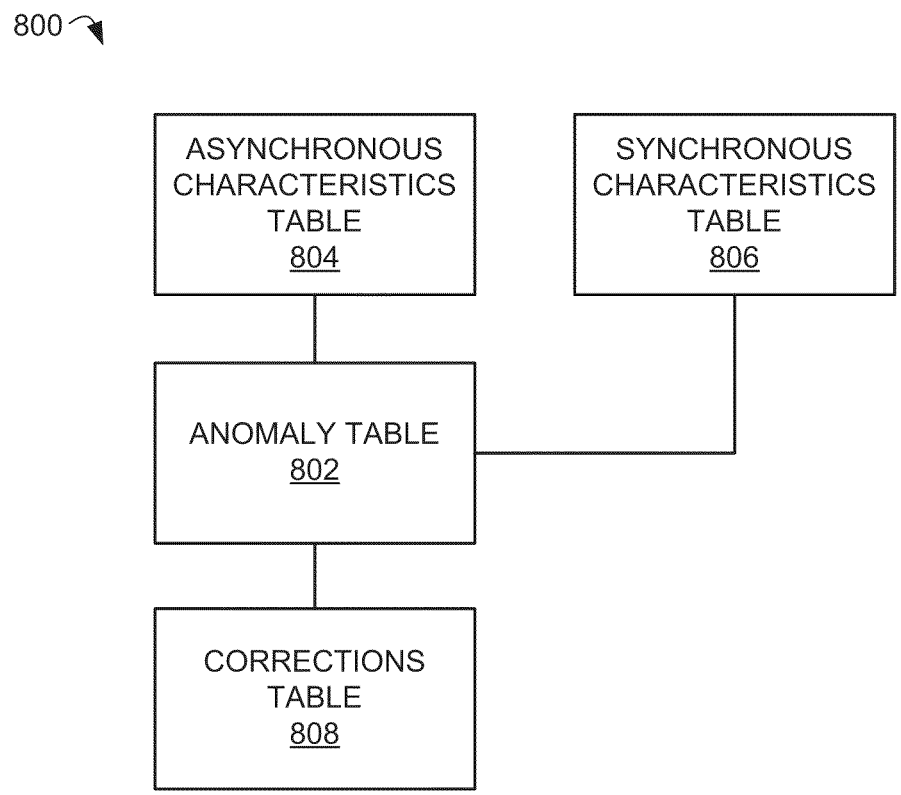
FIG. 8 is a is a high-level entity-relationship diagram, illustrating various tables that may be maintained, in accordance with an example embodiment.

FIG. 8 is a high-level entity-relationship diagram, illustrating various tables 800 that may be maintained, in accordance with an example embodiment. At least some of the tables 800 shown in FIG. 8 may be stored in the fingerprint database 608 of FIG. 6. The tables 800 are accessed by the monitoring center 190 of FIG. 1 and, more specifically, by the asynchronous monitoring engine 200 of FIG. 2, the synchronous monitoring engine 400 of FIG. 4, and the detection engine 600 of FIG. 6.

An anomaly table 802 is to store a record about identified anomalies. The anomaly table may include, for example, an identifier of the anomaly, a history of occurrences of the anomaly, characteristics (or identifiers of characteristics) corresponding to the anomaly, and the like. The history may include an indication of the specific network resource (or type of network resource) where the anomaly occurred.

An asynchronous characteristics table 804 stores records of each of the asynchronous characteristics. The asynchronous characteristics may each be assigned an identifier and a description (human- or computer-readable) of the characteristic. Likewise, a synchronous characteristics table 806 records an identifier associated with each synchronous characteristic and a description. In both the asynchronous characteristics table 804 and the synchronous characteristics table 806, the description may be described using quantitative criteria such as a threshold or a range. In some instances, the asynchronous characteristics table 804 and the synchronous characteristics table 806 may be combined into one table.

The corrections table 808 stores a record of the corrections performed to correct the identified anomalies. Each record of a correction is associated with at least one identifier of an anomaly so that once an ongoing anomaly is identified, the correction can be selected. Upon identifying a new anomaly, a correction may be added to the corrections table 808, or be associated with an existing correction.

Figure 9:
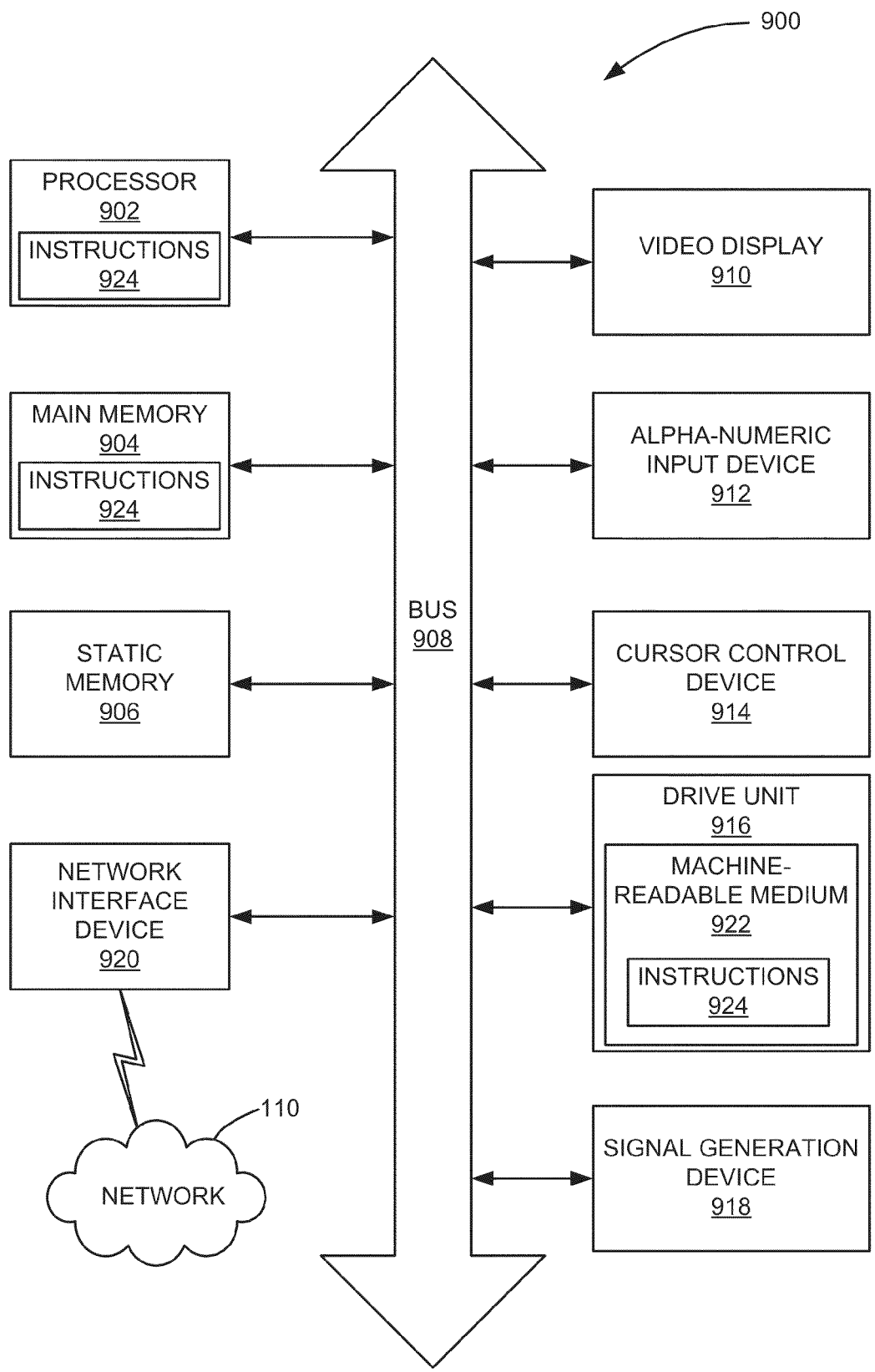
FIG. 9 illustrates a diagrammatic representation of a machine in the example form of a computer system within which a set of instructions for causing the machine to perform any one or more of the methodologies discussed herein may be executed.

FIG. 9 illustrates an example computer system, according to one example embodiment. The example computer system 900 includes a processor 902 (e.g., a central processing unit (CPU), a graphics processing unit (GPU) or both), a main memory 904, and a static memory 906, which communicate via a bus 908. The computer system 900 may further include a video display unit 910 (e.g., liquid crystals display (LCD) or a cathode ray tube (CRT)). The computer system 900 may also include an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions and data structures (e.g., instructions 924) embodying or utilized by any one or more of the methodologies or features described herein. The instructions 924 may also reside, completely or at least partially, within the main memory 904 and within the processor 902 during execution thereof by the computer system 900, the main memory 904 and the processor 902 also constituting machine-readable media.

The instructions 924 may further be transmitted or received over a network 110 via the network interface device 920 utilizing any one of a number of transfer protocols (e.g., HTTP).

While the machine-readable medium 922 is shown in an example embodiment to be a single medium, the term "machine-readable medium" should be taken to include a single medium or multiple media (e.g., a centralized or distributed database, and associated caches and servers) that store the one or more sets of instructions. The term "machine-readable medium" may be taken to include any medium that is capable of storing, encoding, or carrying a set of instructions for execution by the machine and that cause the machine to perform any one or more of the methodologies of the present application, or that is capable of storing, encoding, or carrying data structures utilized by or associated with such a set of instructions. The term "machine-readable medium" may be taken to include, but not be limited to, solid-state memories, optical and magnetic media, and carrier wave signals. Such media may also include hard disks, floppy disks, flash memory cards, digital video disks, random access memory (RAMs), read only memory (ROMs), and the like.

The embodiments described herein may be implemented in an operating environment comprising software installed on a computer, hardware, or a combination of software and hardware.

Thus, a method and system to detect a network deficiency have been described. Although embodiments have been described with reference to specific example embodiments, it will be evident that various modifications and changes may be made to these embodiments without departing from the broader spirit and scope of the present application. Accordingly, the specification and drawings are to be regarded in an illustrative rather than a restrictive sense.

What is claimed is:

1. A system comprising:
an asynchronous monitoring engine in communication with network resources, the network resources comprising the resources of a distributed computing environment and configured to:
receive asynchronous data from a plurality of the network resources;
aggregate the asynchronous data from the plurality of the network resources;
calculate a change in the aggregated asynchronous data over time;
based on the change in the aggregated asynchronous data, search a database of anomalies in an attempt to identify a corresponding anomaly;
in accordance with the search not identifying any corresponding anomaly, requesting synchronous monitoring by a synchronous monitoring engine in communication with the network resources; and
otherwise, not requesting the synchronous monitoring by the synchronous monitoring engine in communication with the network resources;
the synchronous monitoring engine being configured to:
access synchronous data in the application layer in response to receiving a request from the asynchronous monitoring engine; and
a report engine in communication with the asynchronous monitoring engine and the synchronous monitoring engine, the report engine being configured to:
generate a report comprising at least one asynchronous characteristic based on the asynchronous data and at least one synchronous characteristic based on the synchronous data.

2. The system of claim 1, wherein the detection engine is to identify a correction corresponding to the anomaly.

3. The system of claim 1, further comprising a fingerprint database to store a record of the anomaly, the record including an association of the at least one synchronous characteristic and the at least one synchronous characteristic.

4. The system of claim 1, wherein the asynchronous data is accessed at an end user application layer.

5. The system of claim 1, wherein the synchronous data is accessed at an end user application layer.

6. The system of claim 1, wherein the asynchronous monitoring engine is to determine to send the request based on an asynchronous characteristic identified in the asynchronous data.

7. The system of claim 1, wherein the asynchronous monitoring engine aggregates asynchronous data across the network resources.

8. The system of claim 1, wherein the asynchronous monitoring engine aggregates asynchronous data over a period of time.

9. A method comprising:
accessing asynchronous data from a plurality of network resources at an application layer and at an end-user application, the network resources comprising the resources of a distributed computing environment;
aggregating the asynchronous data from the plurality of the network resources;
calculating a change in the aggregated asynchronous data over time;
based on the change in the aggregated asynchronous data, search a database of anomalies in an attempt to identify a corresponding anomaly;
either, in accordance with the search not identifying any corresponding anomaly, requesting synchronous monitoring by a synchronous monitoring engine in communication with the network resources; or
otherwise, not requesting the synchronous monitoring by the synchronous monitoring engine in communication with the network resources;
accessing synchronous data collected by the synchronous monitoring; and
generating a report comprising at least one asynchronous characteristic based on the asynchronous data and at least one synchronous characteristic based on the synchronous data.

10. The method of claim 9, further comprising determining to continue monitoring of the synchronous data.

11. The method of claim 9, further comprising initiating correction of the anomaly.

12. The method of claim 9, further comprising aggregating the asynchronous data over a period of time.

13. The method of claim 9, further comprising aggregating the asynchronous data across a plurality of the network resources.

14. The method of claim 9, wherein the processor aggregates the synchronous data over a period of time and across the first network resource and a second network resource.

15. A non-transitory computer-readable storage device having instructions embodied thereon, the instructions executable by a processor for performing a method comprising:
accessing asynchronous data from a plurality of network resources at an application layer and at an end-user application, the network resources comprising the resources of a distributed computing environment;
aggregating the asynchronous data from the plurality of the network resources;
calculating a change in the aggregated asynchronous data over time;
based on the change in the aggregated asynchronous data, search a database of anomalies in an attempt to identify a corresponding anomaly;
either, in accordance with the search not identifying any corresponding anomaly, requesting synchronous monitoring by a synchronous monitoring engine in communication with the network resources; or
otherwise, not requesting the synchronous monitoring by the synchronous monitoring engine in communication with the network resources;
accessing synchronous data collected by the synchronous monitoring; and
generating a report comprising at least one asynchronous characteristic based on the asynchronous data and at least one synchronous characteristic based on the synchronous data.

* * * * *